United States Patent
Yang

[11] Patent Number: 5,992,955
[45] Date of Patent: Nov. 30, 1999

[54] STRUCTURE OF COMPUTER

[75] Inventor: Andy K. Yang, Hayward, Calif.

[73] Assignee: Hon Hai Prcision Ind. Co., Ltd., Hsien, Taiwan

[21] Appl. No.: 08/971,323

[22] Filed: Nov. 17, 1997

[51] Int. Cl.[6] ..................... H05K 7/18
[52] U.S. Cl. ............... 312/265.6; 312/223.2; 312/263; 220/4.31; 361/732
[58] Field of Search ............ 312/223.2, 223.1, 312/257.1, 263, 265.1, 265.2, 265.3, 265.5, 265.6; 292/DIG. 37, DIG. 38; 248/300; 361/683, 724, 686, 730, 732, 753, 799, 800, 818, 825; 220/4.02, 4.31, 4.28; 307/150; 174/51

[56] References Cited

U.S. PATENT DOCUMENTS

| | | | |
|---|---|---|---|
| 2,658,101 | 11/1953 | Coxe, Jr. | 220/4.28 X |
| 4,154,493 | 5/1979 | Prater | 312/265.5 |
| 4,821,145 | 4/1989 | Corfits et al. | 174/51 X |
| 5,031,070 | 7/1991 | Hsu | 361/683 |
| 5,121,296 | 6/1992 | Hsu | 361/685 |
| 5,124,885 | 6/1992 | Liu | 312/263 X |
| 5,136,468 | 8/1992 | Wong et al. | 361/683 |
| 5,158,329 | 10/1992 | Schlack | 292/DIG. 38 |
| 5,197,789 | 3/1993 | Lin | 312/223.2 |
| 5,269,598 | 12/1993 | Liu | 312/223.2 |
| 5,397,176 | 3/1995 | Allen et al. | 312/265.6 X |
| 5,600,538 | 2/1997 | Xanthopoulos | 361/683 |
| 5,691,504 | 11/1997 | Sand et al. | 174/51 X |
| 5,751,545 | 5/1998 | Jung | 312/223.2 X |
| 5,777,848 | 7/1998 | McAnally et al. | 361/683 X |
| 5,785,398 | 7/1998 | Park | 312/223.2 |
| 5,845,977 | 12/1998 | Neukam et al. | 312/265.5 X |

FOREIGN PATENT DOCUMENTS

| | | | |
|---|---|---|---|
| 1015496 | 1/1966 | United Kingdom | 220/4.31 |

Primary Examiner—Janet M. Wilkens

[57] ABSTRACT

An enclosure (10) of a computer includes a U-shaped frame (12) consisting essentially of a front panel (14), a rear panel (16) and a bottom panel (18) therebetween, commonly defining therein a rectangular parallelepiped space for receiving therein the components such as the mother board, the drive and the power supply (64), etc. Two side panels (30) are attached to the frame (20). A top cover (40) is slid unto the top of the frame (12) with a locking device (42) for releasably securing the top cover (30) with regard to the frame (12), thereby allowing easy inspection and repair of the defective internal components. The frame (12) further includes a securement plate (76) with a plurality of grounding fingers (78) thereon for retaining the switch power supply (64) in position. A number of grounding fingers (84) are provided on the top edge of the rear panel (16) of the frame (12) corresponding to the fingers (78) of the securement plate (76), thereby providing the power supply (64) with superior grounding.

3 Claims, 9 Drawing Sheets

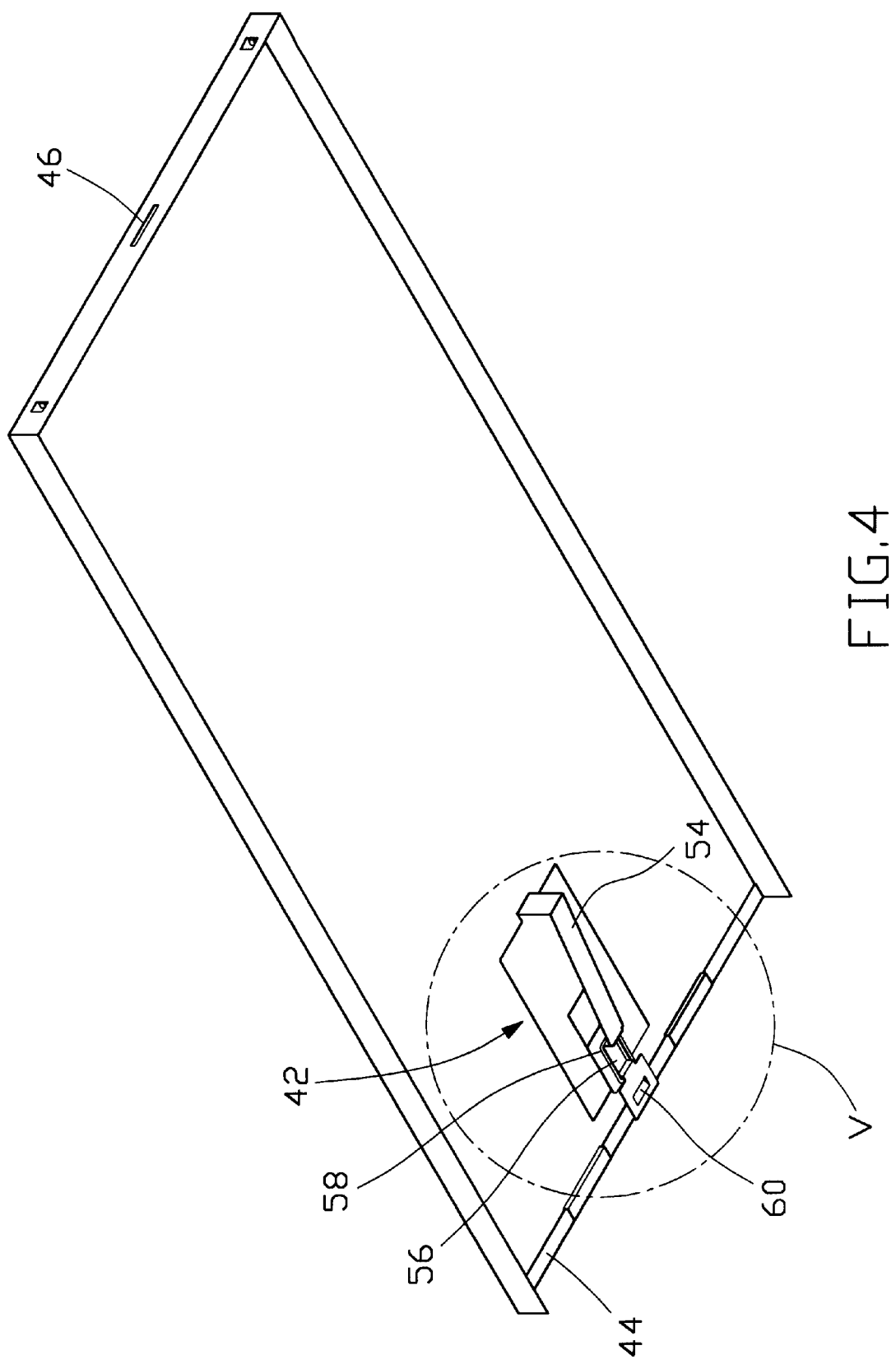

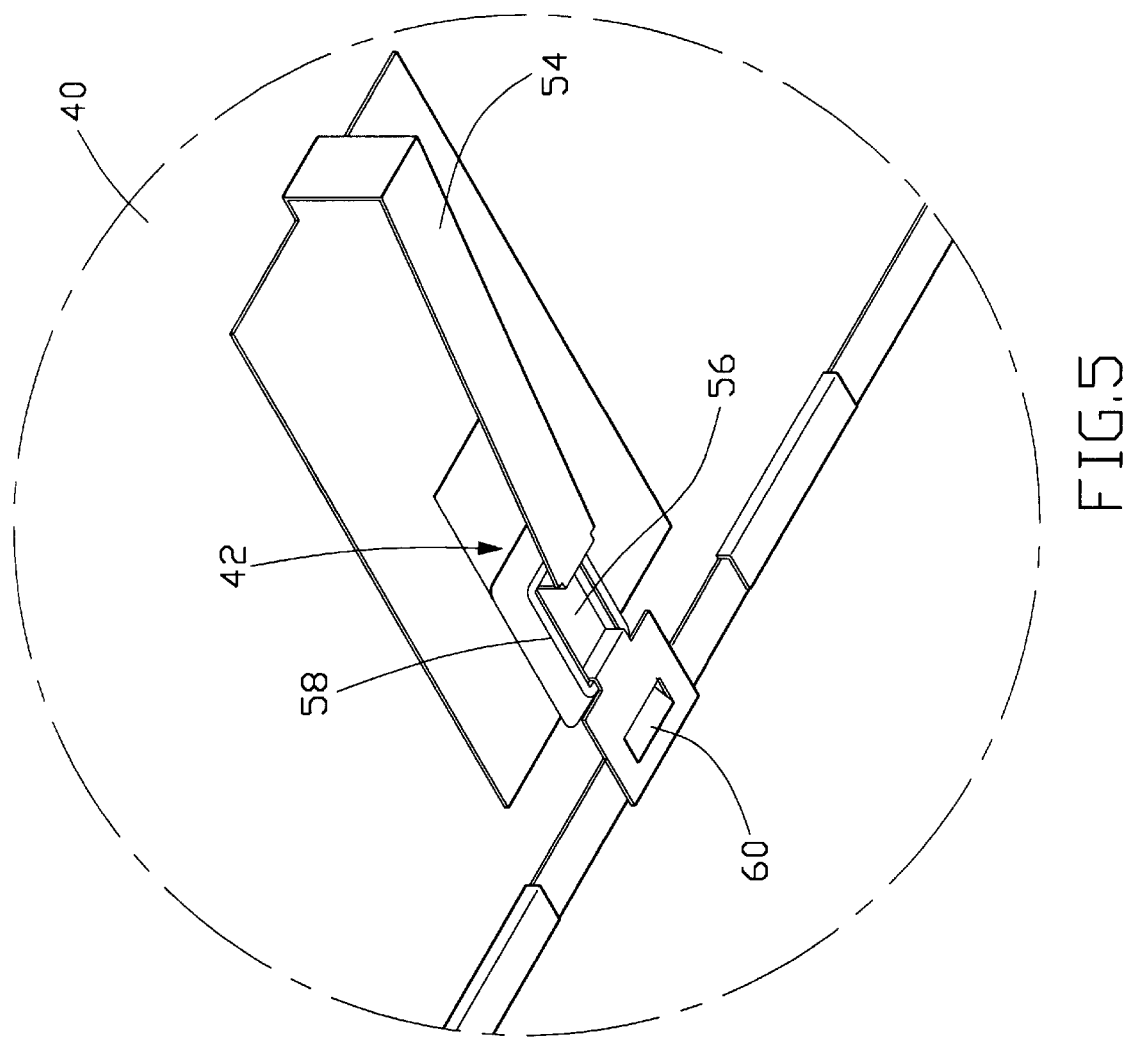

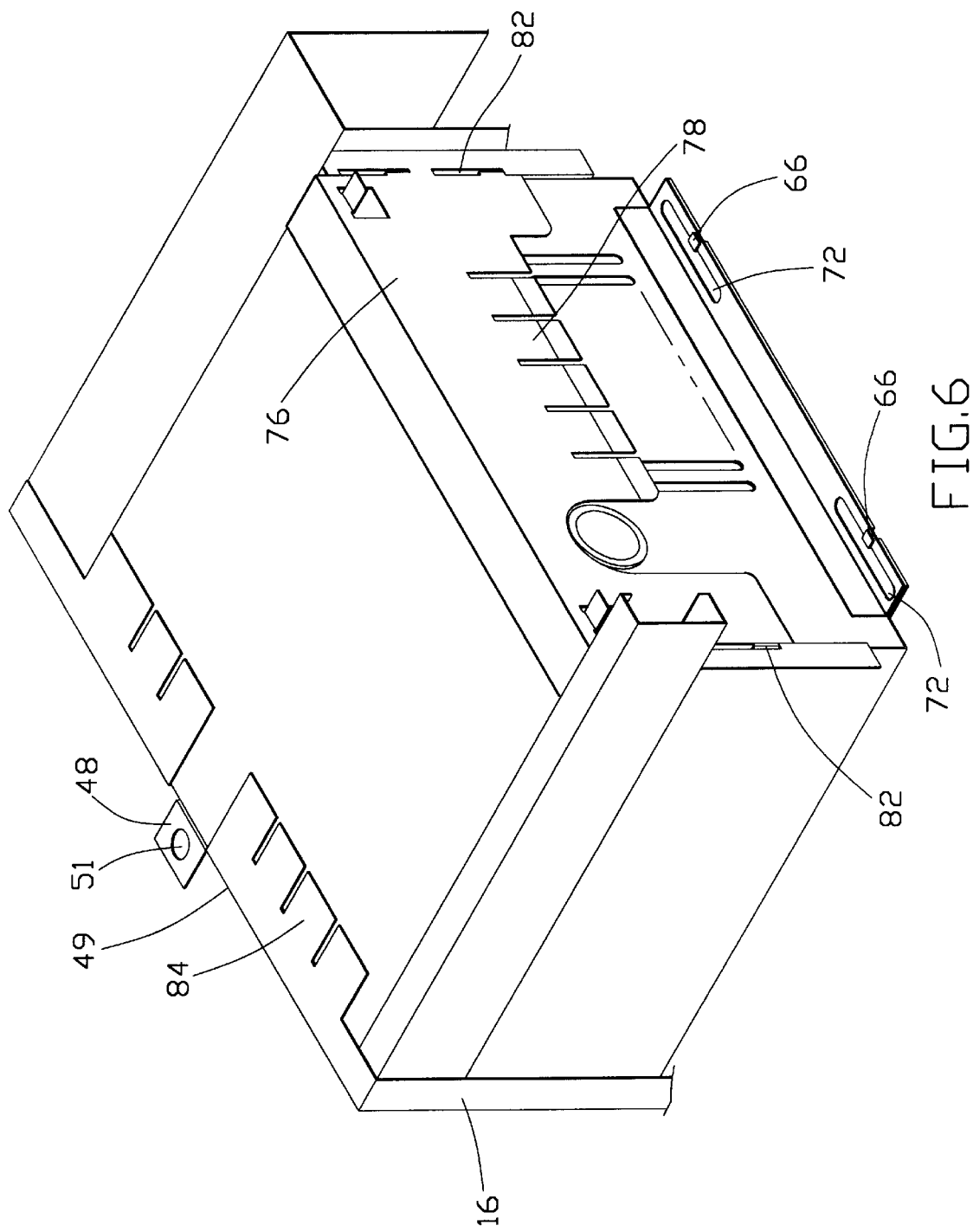

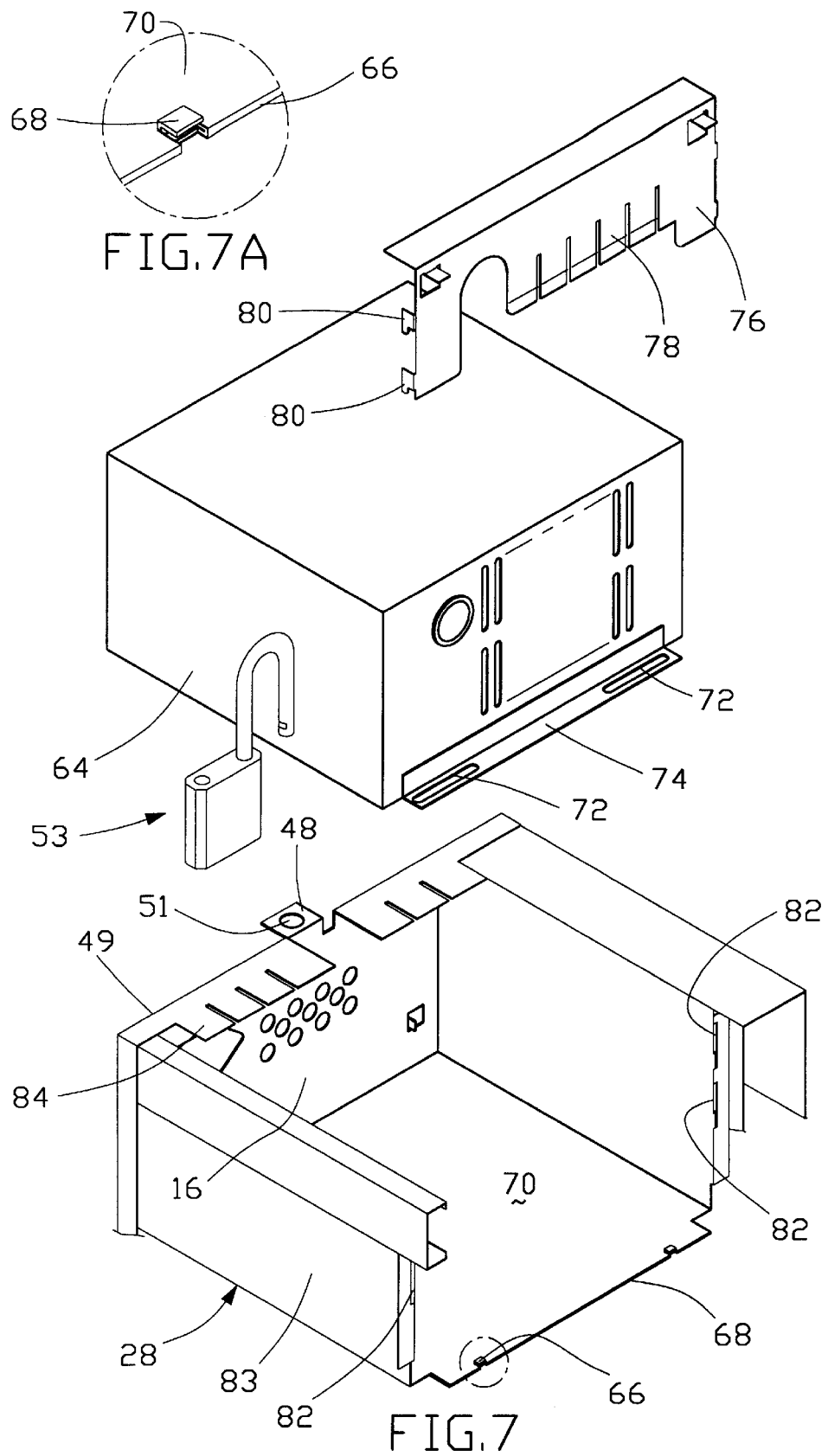

STRUCTURE OF COMPUTER

BACKGROUND OF THE INVENTION

1. Field of the Invention

The invention relates to an enclosure of the computer, and particularly to an arrangement of assembling the enclosure and the corresponding internal components.

2. The Related Art

U.S. Pat. Nos. 5,124,885, 5,164,886, 5,278,351, 5,587,977, 5,590,938, 5,600,538 and 5,660,297, disclose different ways to assemble the computer case for protectively enclosing the corresponding components, such as the drives and the power supply, therein. Generally speaking, each design has its own concern and the corresponding purpose for either easy assembling/disassembling and manufacturing or saving money.

An object of the invention is to provide a structure of a computer case which is easy to be assembled and disassembled.

Another object of the invention is to provide a structure of the computer case for easy installation of the power supply.

SUMMARY OF THE INVENTION

According to an aspect of the invention, an enclosure of a computer includes a U-shaped frame consisting essentially of a front panel, a rear panel and a bottom panel therebetween, commonly defining therein a rectangular parallelepiped space for receiving therein the components such as the mother board, the drive and the power supply, etc. Two side panels are attached to the frame. A top cover is slid unto the top of the frame with a locking button for releasably securing the top cover with regard to the frame, thereby allowing easy inspection and repair of the defective internal components. The enclosure further includes a securement plate with a plurality of grounding fingers thereon for retaining the switch power supply in position. A number of grounding fingers are provided on the top edge of the rear panel of the frame corresponding to the fingers of the securement plate, thereby providing the power supply with superior grounding.

BRIEF DESCRIPTION OF THE DRAWINGS

FIG. 4 is a bottom perspective view of the top cover of the enclosure of FIG. 1.

FIG. 5 is an enlarged perspective view of the top cover of FIG. 4 to show the locking device thereof.

FIG. 6 is an enlarged perspective view of the assembled switch power supply with the corresponding power supply bracket and the opposite rear panel and securement plate of FIG. 2.

FIG. 7 is an enlarged partial perspective view of the enclosure of FIG. 2 to show how the switch power supply is supportably engaged with the power supply bracket, the rear panel and the securement plate.

FIG. 7A is an enlarged partial view of the power supply bracket of FIG. 7 showing a hook thereof.

DETAILED DESCRIPTION OF THE PREFERRED EMBODIMENTS

References will now be in detail to the preferred embodiments of the invention. While the present invention has been described in with reference to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

Figure 1:
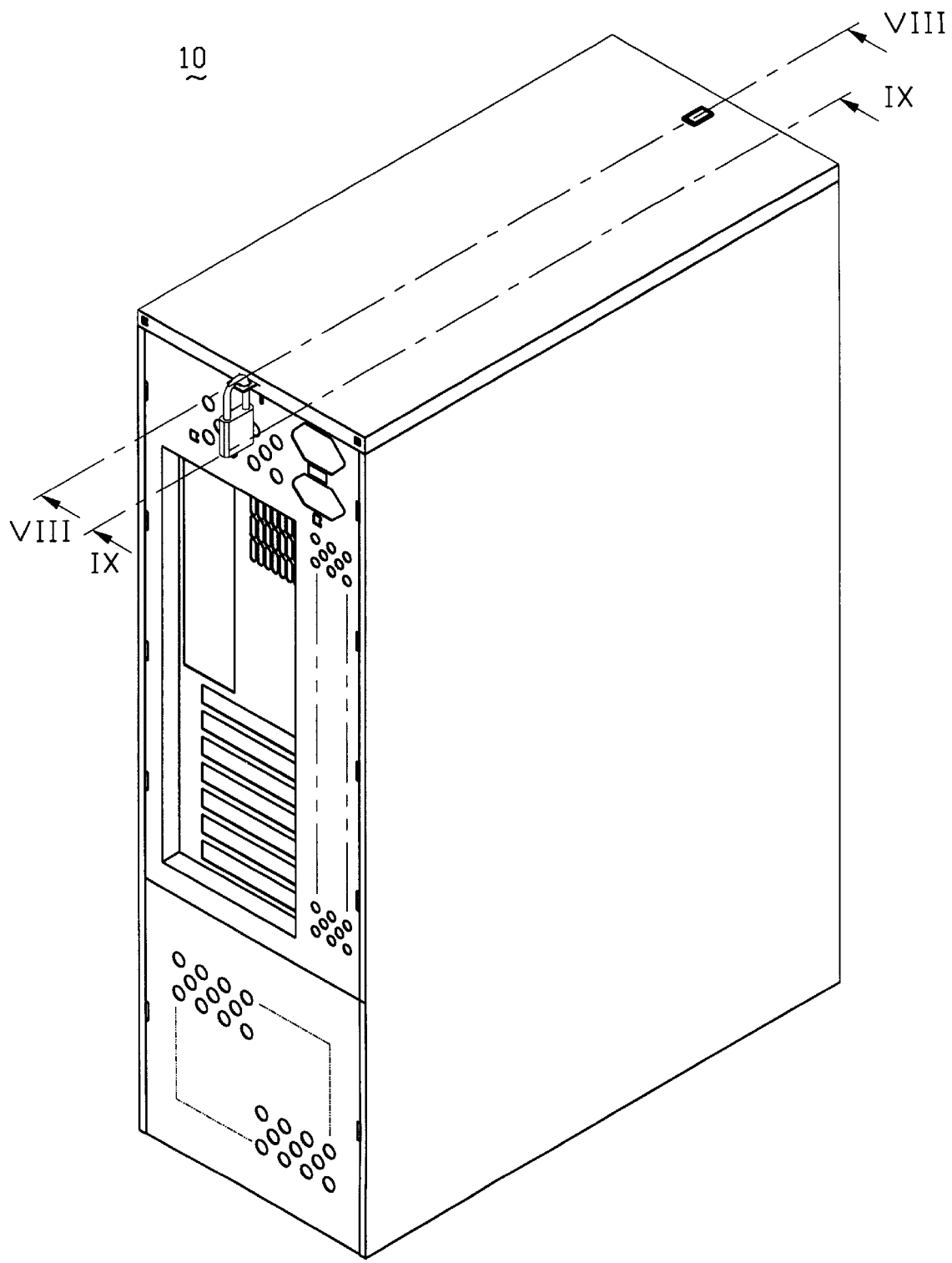
FIG. 1 is a perspective view of presently preferred embodiment of an enclosure of a computer, according to the invention.
Figure 2:
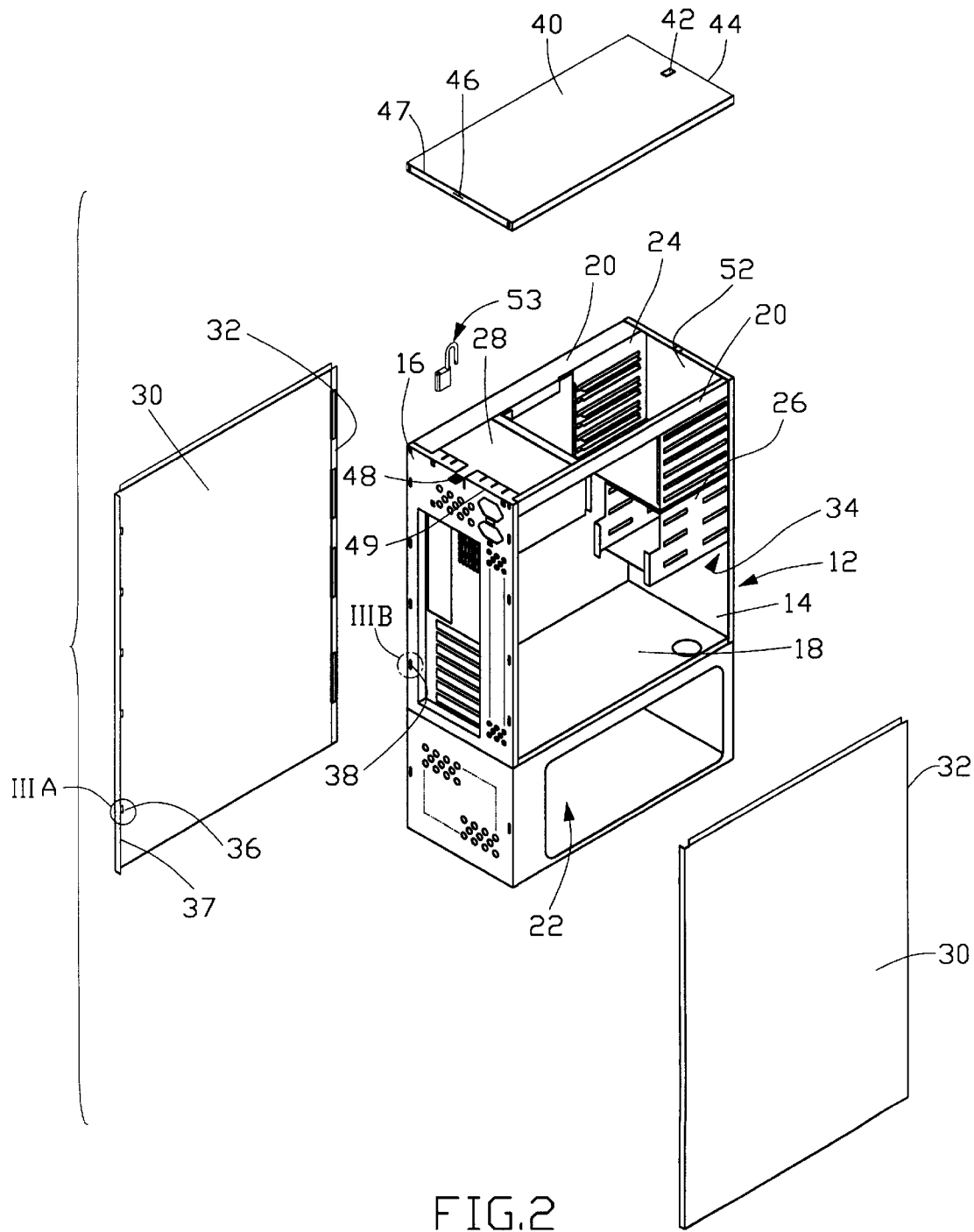
FIG. 2 is a partially exploded perspective view of the enclosure of FIG. 1 wherein the drive box, the drive cage and the power supply bracket have been assembled to the frame.

It will be noted here that for a better understanding, most of like components are designated by like reference numerals throughout the various figures in the embodiments. Attention is directed to FIGS. 1–3 wherein an enclosure 10 of a computer includes a U-shaped frame 12 consisting essentially of a front panel 14, an opposite rear panel 16 and a bottom panel 18 therebetween. Two reinforcement bars 20 are fastened between the top portions of the front panel 14 and the rear panel 16. A compressor holder 22 is positioned under the frame 12 for enclosing a compressor (not shown) therein.

Adjacent to the front panel 14, a drive cage 24 for receiving the CD-ROM and the associated drive box 26 for receiving floppy drive is fastened to the frame 12 through binding to the reinforcement bars 20. Similarly, a power supply bracket 28 is secured to the frame 12 through binding to the reinforcement bars 20 adjacent to the rear panel 16.

Referring to FIGS. 1–3, two side panels 30 are respectively mounted to two sides of the frame 12 in a back-to-front direction wherein the front edge 32 of the side panel 30 can be engaged with the side edge 34 of the front panel 14, and the hooks 36 on the rear edge 37 of the side panel 30 may be respectively latchably received within the locking slots 38 in the rear panel 16.

A top cover 40 can be slid along the top of the reinforcement bars 20 in a back-to-front direction and locked with the front panel 14 by means of the locking device 42 adjacent the front edge section 44 thereof. A locking slot 46 adjacent the rear edge 47 of the top cover 40 also receiveably engages the projection 48 rearward extending from the top edge 49 of the rear panel 16, whereby a hanging lock 53 can lock such projection 48 by extending through the hole 51 thereof (FIGS. 6 and 7) for avoidance of release of the projection 48 from the locking slot 46. Under this situation, the top cover 40 can be securely fixed to the frame 12.

Figure 8:
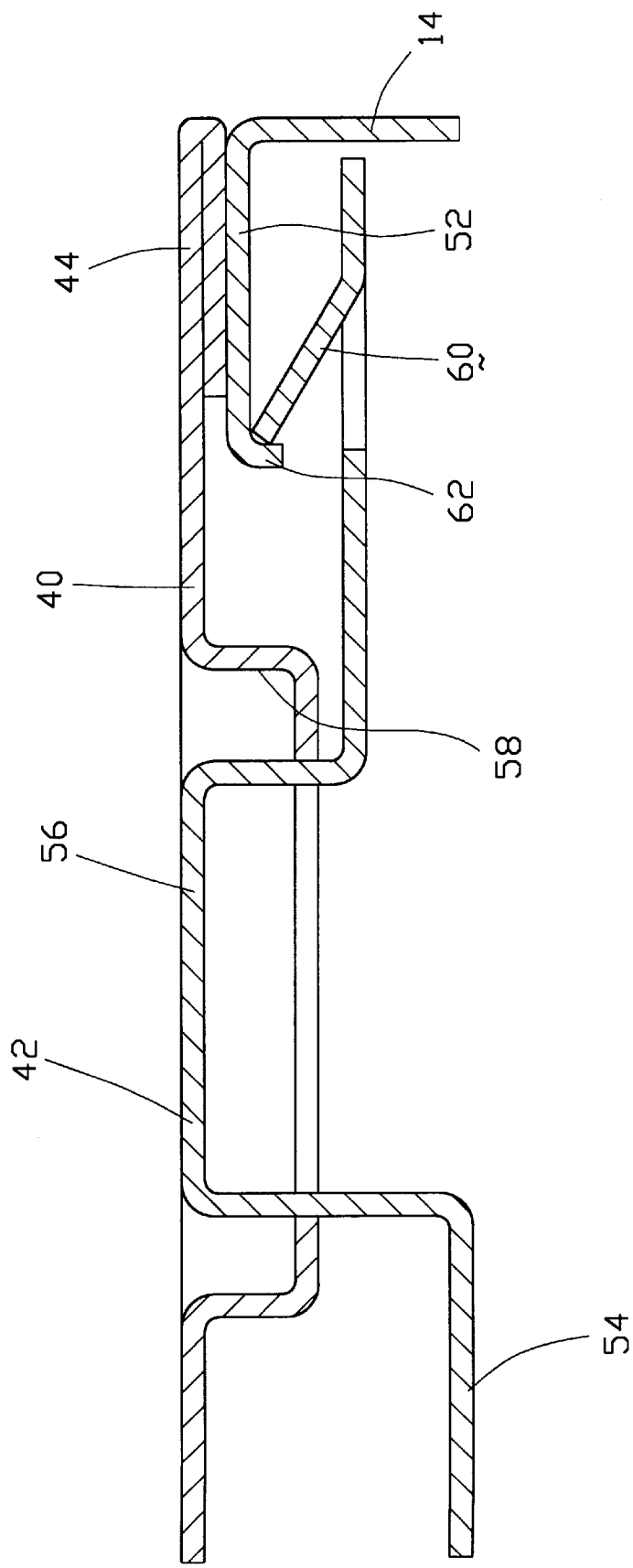
FIG. 8 is a partial cross-sectional along line VIII—VIII of the enclosure of FIG. 1 to show how the locking button can releasably latch the top cover and the front panel together.
Figure 9:
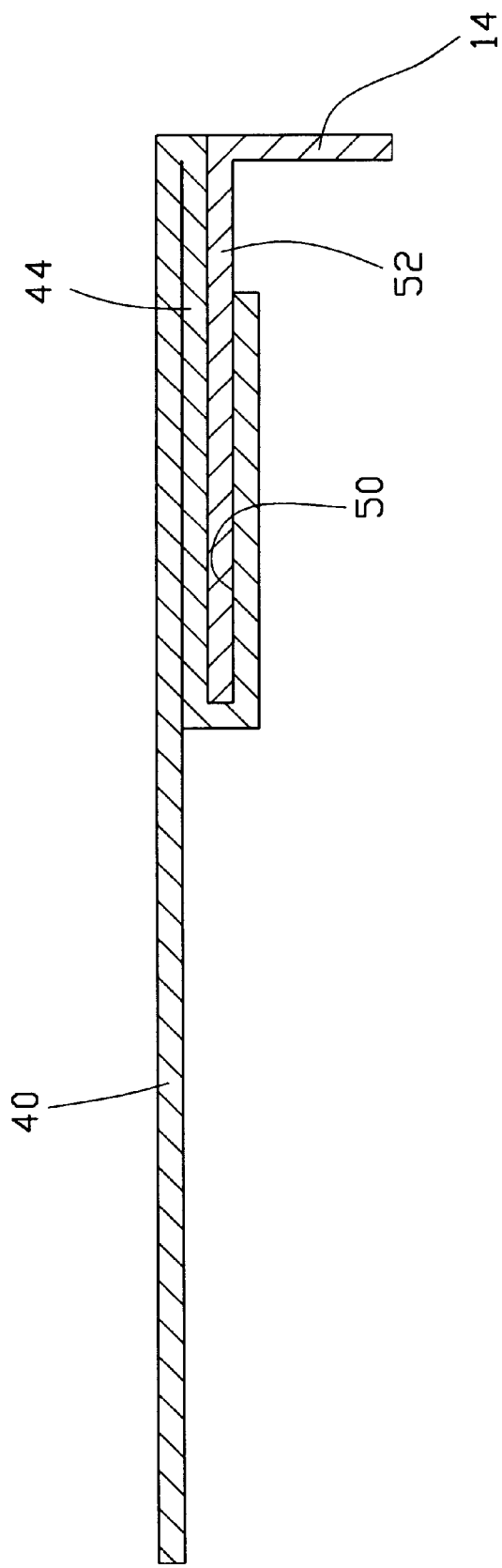
FIG. 9 is a partial cross-sectional view along line IX—IX of the enclosure of FIG. 1 to show how the flange of the front panel is received within the slot formed by the front edge section of the to cover.

Two features are provided in the invention. The first one is regarding the structure for combining the top cover 40 and the front panel 14. Also referring to FIGS. 1–5, 8 and 9, the front edge section 44 of the top cover 40 around the region of the cross-section line IX (FIG. 1) forms a receiving slot 50 (FIG. 9) whereby the flange 52 on the top edge of the front panel 14 may be embedded therein for preventing the top cover 40 from upward or forward moving. Differently, referring to FIG. 8, the front edge section 44 of the top cover 40 around the region of the cross-section line VIII (FIG. 1) forms a locking device 42 thereabouts. Such locking device 42 includes a resilient lever 54 with a locking press button 56 exposed within an opening 58 formed in the top cover 40 and further with a latching lance 60 at the front end for latchable engagement with an engagement tag 62 formed on the flange 52 of the front panel 14.

Therefore, when assembled, the top cover 40 is latchably secured to the front panel 14 by means of engagement of the latching lance 60 with the engagement tag 62 of the front panel 14. Oppositely, when disassembled, the press button 56 of the top cover 40 is forcibly moved downward to disengage the latching lance 60 from the engagement tag 62 of the front panel 14, thereby allowing the top cover 40 to move rearward.

Referring to FIGS. 2, 6, 7 and 7(A), the second feature of the invention is regarding installation of the power supply 64. The power supply bracket 28 provides the space for receiving therein the power supply 64 wherein the power supply 64 is inserted into such space in generally a front-to-back direction with a slightly slanted angle. First, the locking hooks 66, which are positioned around the edge 68 of the base plate 70 of the bracket 28, can be received within the elongated aperture 72 formed on the flange 74 of the power supply 64. Successively, the power supply 64 moves rearward to have the hooks 66 of the bracket 28 properly and lock the flange 74 of the power supply 64 in position. Finally, a power supply securement plate 76 is attached to the bracket 28 by means of engagement of the latching hooks 80 thereof within the latching slot 82 in vertical wall 83 of the bracket 28, whereby fingers 78 of the securement plate 76 may press against the back of the power supply 64 for preventing forward movement of the power supply 64, thereby securing the power supply 64 in space defined by the bracket 28. It is noted that similar to the securement plate 76, the rear panel 16 includes fingers 84 for cooperation with the fingers 78 of the securement plate 76 for grounding and retaining the power supply 64 therebetween.

The invention provides a novel structure and the corresponding assembling method to form an enclosure, for receiving the components therein, without screwing or other odd assembling procedure, thus saving time and cost during manufacturing.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, person of ordinary skill in this field are to understand that all such equivalent structures are to be included within the scope of the following claims.

We claim:

1. An enclosure for a computer, comprising:

a frame consisting essentially of a front panel, a rear panel and a bottom panel;

two separate side panels attached to two sides of the frame;

a top cover attached to a top portion of the frame wherein a locking device for engagement with said front panel is provided on the top cover for releasably latching the top cover to the front panel, said locking device including only an integrally formed resilient lever with a press button exposed in an opening for providing accessibility from an exterior and with a latching lance for releasable engagement with an engagement tag of the front panel.

2. The enclosure as defined in claim 1, wherein said top cover defines a slot for receiving a projection of the rear panel therein, said projection defining a hole, thereby allowing a hanging lock to lock the top cover and the rear panel together.

3. A method for assembling an enclosure of a computer wherein said enclosure includes a frame having a front panel, an opposite rear panel, and a bottom panel therebetween, two separate side panels and a top cover, the assembling steps comprising:

attaching each of said side panels to the frame in a back-to-front direction whereby hooks of the side panels are latchably received within corresponding locking slots of the rear panel; and attaching the top cover to a top portion of the frame along the same back-to-front direction whereby a locking device of the top cover releasably latches the top cover to the front panel;

wherein the top cover is fastened to the rear panel through a projection of the rear panel, said projection defining a hole and extending rearward through a locking slot of the top cover and locked by a hanging lock.

* * * * *

UNITED STATES PATENT AND TRADEMARK OFFICE
CERTIFICATE OF CORRECTION

PATENT NO. : 5,992,955

DATED : November 30, 1999

INVENTOR(S) : Andy K. Yang

Figure 3B:
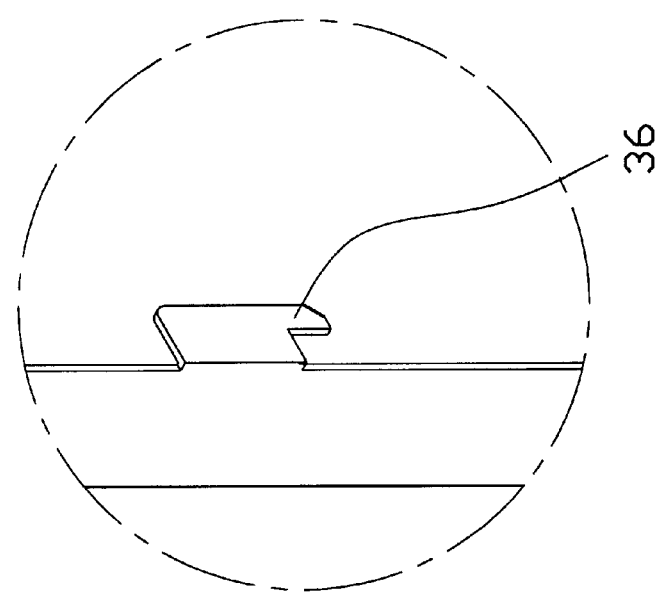
FIG. 3 is a partially enlarged view of FIG. 2 to show the hook of the side panel and the locking slots of the rear panel.
Figure 3A:
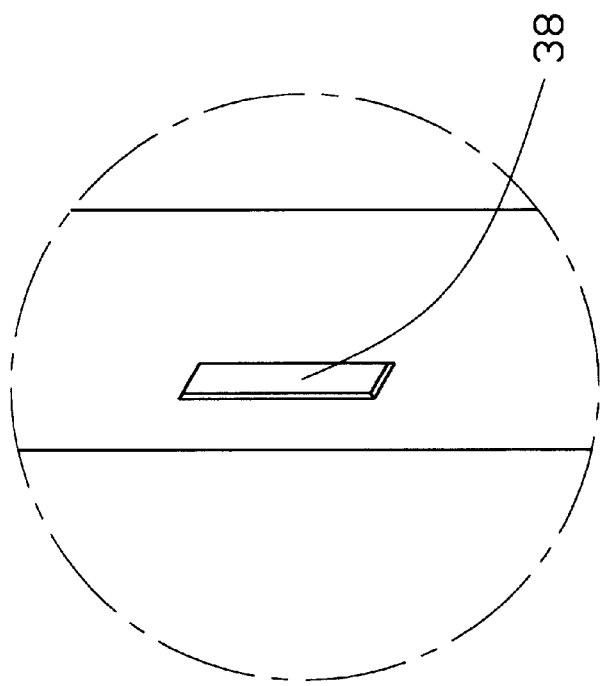

It is certified that error appears in the above-identified patent and that said Letters Patent is hereby corrected as shown below:

Column 1, line 51, delete "FIG. 3 is a partially enlarged view" and insert -- FIGS. 3A and 3B are partially enlarged views--.

Column 2, line 24, change "1-3" to --1, 2, 3(A) and 3(B)--.

Column 2, line 58, change "1-3" to --1, 2, 3(A) and 3(B)--.

Signed and Sealed this

Twenty-ninth Day of August, 2000

Attest:

*Attesting Officer*

Q. TODD DICKINSON

*Director of Patents and Trademarks*